United States Patent [19]

Tsuruyama et al.

[11] Patent Number: 5,370,216

[45] Date of Patent: Dec. 6, 1994

[54] APPARATUS FOR ALIGNING VESSELS

[75] Inventors: Katsuji Tsuruyama; Masaki Murahama; Kenji Yoneda, all of Ishikawa, Japan

[73] Assignee: Shibuya Kogyo Co., Ltd., Ishikawa, Japan

[21] Appl. No.: 199,094

[22] Filed: Feb. 22, 1994

[30] Foreign Application Priority Data

Mar. 5, 1993 [JP] Japan .................................. 5-071032
Nov. 26, 1993 [JP] Japan .................................. 5-321238

[51] Int. Cl.$^5$ .............................................. B65G 43/08
[52] U.S. Cl. .................................... 198/395; 198/401; 198/376
[58] Field of Search ............... 198/374, 376, 382, 395, 198/396, 398, 400, 401, 407, 412, 416; 901/47

[56] References Cited

U.S. PATENT DOCUMENTS

| | | | |
|---|---|---|---|
| 4,034,844 | 7/1977 | Deak et al. ........................... | 198/400 |
| 4,213,526 | 7/1980 | Graham et al. . | |
| 4,249,439 | 2/1981 | Leclerc et al. ..................... | 198/376 X |
| 4,271,954 | 6/1981 | Gosney . | |
| 4,530,430 | 7/1985 | Peterlini ............................. | 198/395 |
| 4,574,939 | 3/1986 | Dubuit . | |
| 4,629,055 | 12/1986 | Aivola .............................. | 198/412 X |
| 4,819,784 | 4/1989 | Sticht ................................. | 198/395 |
| 4,909,376 | 3/1990 | Herndon et al. .................... | 198/395 |
| 4,949,834 | 8/1990 | Schindel . | |
| 5,065,852 | 11/1991 | Marti . | |
| 5,236,077 | 8/1993 | Hoppmann et al. ............. | 198/395 X |

FOREIGN PATENT DOCUMENTS

| | | | |
|---|---|---|---|
| 0057416 | 3/1988 | Japan .................................. | 198/401 |
| 1-57004 | 12/1989 | Japan . | |
| 2167211 | 5/1986 | United Kingdom ................ | 198/395 |

OTHER PUBLICATIONS

*English translation of abstract for Japanese Publication No. 1-57004.

Primary Examiner—James R. Bidwell
Attorney, Agent, or Firm—Flynn, Thiel, Boutell & Tanis

[57] ABSTRACT

An apparatus for aligning vessels comprises a robot for delivering a vessel from a first conveyor to a second conveyor, a camera disposed on a path of conveyance of the first conveyor for photographing a manner of placement of vessels thereon, and correction device mounted on the second conveyor for erecting a vessel assuming a horizontal position when it is released by the robot. Any change in the size of a vessel does not require a remodelling of components of the apparatus, thus providing a vessel aligning apparatus having a high versatility.

11 Claims, 14 Drawing Sheets

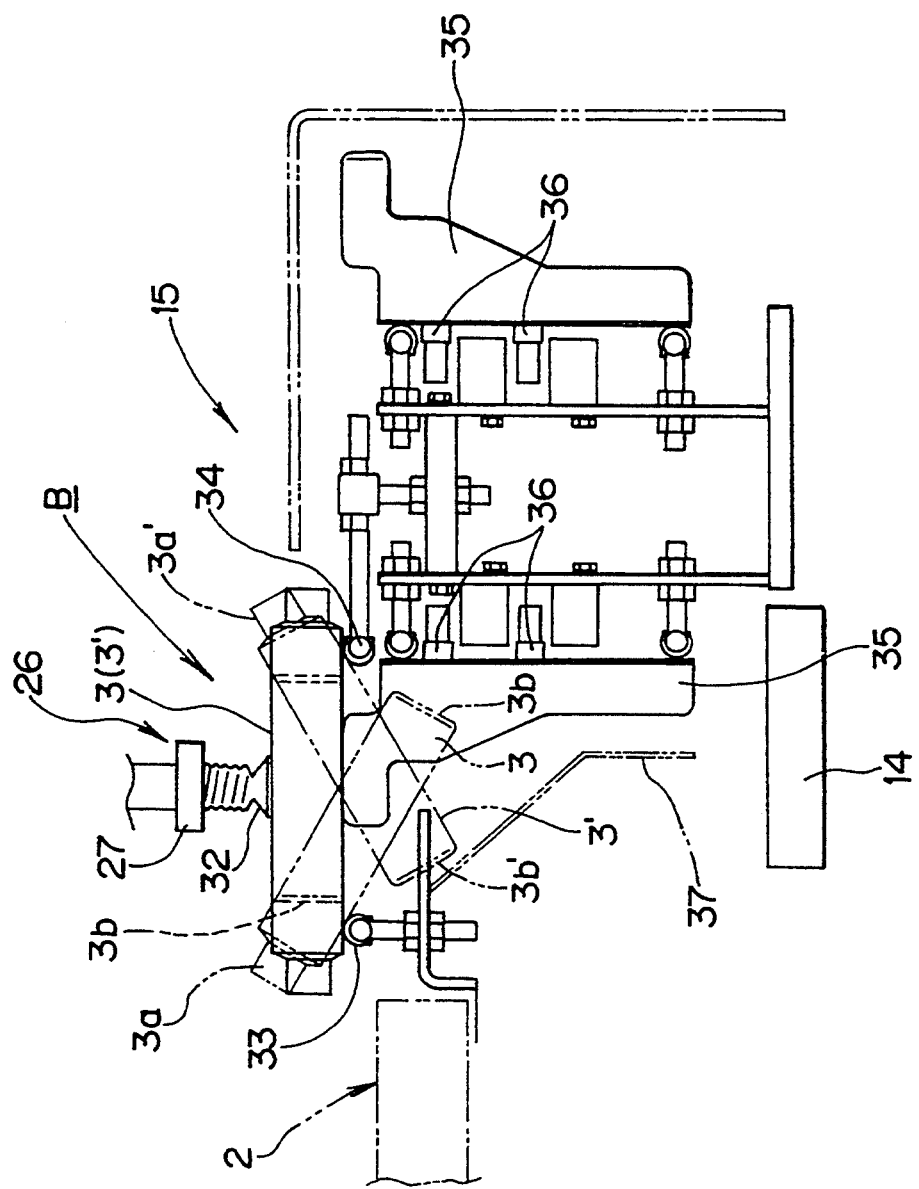

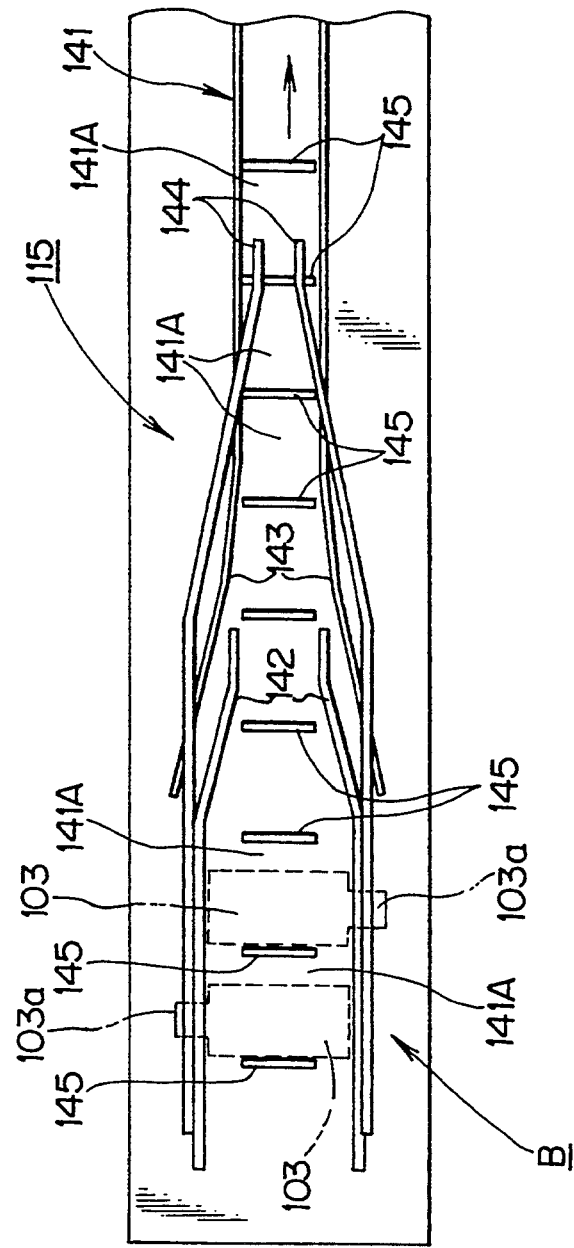

APPARATUS FOR ALIGNING VESSELS

FIELD OF THE INVENTION

The invention relates to an apparatus for aligning vessels, and more particularly, to such apparatus which utilizes a robot.

Description of the Prior Art

An apparatus for aligning vessels sequentially in a given direction as they are supplied at random is disclosed, for example, in Japanese Patent Publication No. 57,004/1989.

The disclosed apparatus comprises a discharge conveyor and a chute which is disposed over the discharge conveyor and extending vertically upward, the chute having a feed port at its upper end through which vessels are supplied sequentially and at random. The chute is internally provided with a stop against which a vessel is temporarily supported, and is successively aligned by an engaging plate and a support member which are disposed below the stop. Specifically, when the vessel is released from the support by the stop, it then drops until its top end or bottom end is engaged by the support member which assumes an advanced position. As the support member retracts to its retracted position, a barrel portion of the vessel supported by the support member is engaged with the engaging plate. If the vessel is engaged with the engaging plate in its erected condition, the vessel is allowed to pass while maintaining its erected position, but in the event the vessel is engaged with the engaging plate in its inverted condition, the vessel is reversed into its erected position before it falls onto the discharge conveyor. With this arrangement, the vessels, which are supplied into the chute at random, are aligned with each other and assume an erected position having its top end oriented upside after they have fallen through the chute to be placed on the discharge conveyor.

However, in a conventional apparatus as mentioned above, if the size of vessels to be processed is changed, the chute as well as other components must be changed in accordance with the new size of the vessel, resulting in a troublesome remodelling operation.

In view of the foregoing, the present invention provides an apparatus for aligning vessels comprising a first conveyor for conveying vessels which are supplied at random, a second conveyor located adjacent to the first conveyor for conveying the vessels, a camera disposed on the path of conveyance of vessels on the first conveyor for photographing the manner of placement of a vessel thereon, a robot responsive to the camera for aligning a vessel on the first conveyor into a given direction and delivering it from the first to the second conveyor, and correcting means disposed on the path of conveyance of vessels on the second conveyor for erecting a vessel conveyed on the second conveyor.

With this arrangement, no remodelling operation of components are required if the size of vessels to be processed is changed. Accordingly, the apparatus can be used with vessels having sizes which vary in a given range, thus improving the versatility thereof.

Above and other objects, features and advantages of the invention will become apparent from the following description of several embodiments thereof with reference to the attached drawings.

BRIEF DESCRIPTION OF THE DRAWINGS

FIG. 10 is a cross section taken along the line X—X shown in FIG. 9;

FIG. 14 is a plan view of FIG. 13;

DETAILED DESCRIPTION OF EMBODIMENTS

Figure 1:
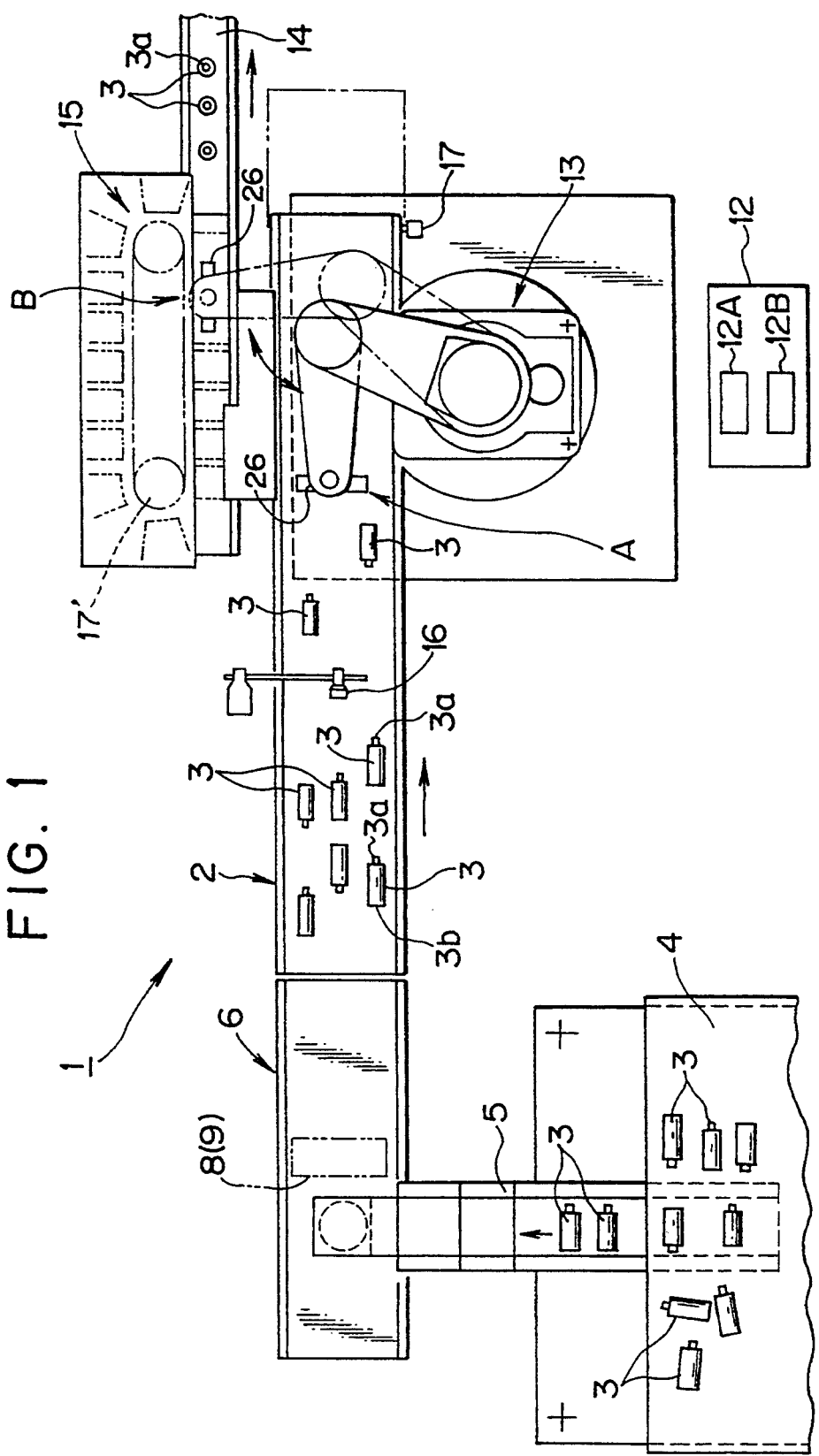
FIG. 1 is a plan view of one embodiment of the invention.

Several embodiments of the invention will now be described with reference to the drawings. Initially referring to FIG. 1, an apparatus 1 for aligning vessels is adapted to erect vessels 3, which are supplied onto a first conveyor 2 in their horizontal positions, into upright position and align them in a single longitudinal row.

The vessel 3 in this embodiment comprises a generally cylindrical plastic vessel having a circular cross section, and a mouth 3a projects centrally from the top end of the vessel while its bottom 3b is formed as a flat surface.

A hopper 4 represents a reservoir of vessels 3, and a feeder 5 which is disposed at an angle for running along a circulating path successively takes out vessels from within the hopper 4 and drops them onto a chute 6 which is located adjacent to an upstream end of the first conveyor 2.

As shown in FIGS. 3 to 6, in the present embodiment, the chute 6 is disposed to be inclined so that the elevation of its downstream end is lowest. On the other hand, the upper region of the chute 6 is corrugated in section so as to form a plurality of guide grooves 6a extending parallel to the running direction of the first conveyor 2. In the lower region, the surface of the chute 6 is provided with sliding guides 6b in the form of rods having a triangular cross section, which are parallel to each other and which are spaced apart in a manner commensurate with the width of each guide groove 6a. A plurality of engaging brushes 8 and engaging rollers 9, which are driven for rotation by a mortor 7, are disposed over the respective guide grooves 6a at an intermediate position along the length thereof.

Accordingly, the vessels 3 which are successively taken out of the hopper 4 by the feeder 5 and dropping onto the chute 6 initially move along the sliding guides 6b before they are supplied onto the first conveyor 2. If a plurality of vessels 3 overlap each other in the guide groove 6a of the chute 6, the upper one of such vessels 3 will be engaged by the brush 8 and the roller 9, which are effective to eliminate such overlapping relationship. In this manner, individual vessels 3 will be supplied onto the first conveyor 2 in a single tier and as oriented parallel to the direction of the first conveyor 2.

A robot 13 associated with a controller 12 which controls its operation is disposed along one side of the first conveyor 2 at its downstream end. The upstream end of a discharge conveyor 14 is located on the opposite side of the first conveyor 2 from the robot 13, and is associated with correction means 15 which is effective to erect the vessel 3 from their horizontal to their upright position.

The robot 13 is operative to catch a vessel 3 on the first conveyor 2 at catch position A which is predefined on the first conveyor 2, to move it to a release position B which is predefined on the discharge conveyor 14, and to release the vessel which it has caught to allow it to drop onto the discharge conveyor 14 at the release position B. Upon falling onto the discharge conveyor 14, the vessel 3 is engaged with the correction means 15, whereby it is erected to its upright position from its horizontal position. A rotary encoder 17' is connected to the connection means 15.

A CCD camera 16 is disposed over the path of conveyance of the first conveyor 2, at a point upstream of the location of the robot 13, for photographing the manner of placement of each individual vessel 3 as it is conveyed on the first conveyor 2 for feeding the resulting picture signal to the controller 12. A rotary encoder 17 is connected to the downstream end of the first conveyor 2 to detect a pulse signal, which is also input to the controller 12.

As will be described later in detail, the controller 12 is operative to cause a reciprocating movement of the robot 13 between the catch position A and the release position B based on the picture of the vessel 3 as supplies from the CCD camera 16 and the pulse signal from the rotary encoder 17, 17'.

Figure 2:
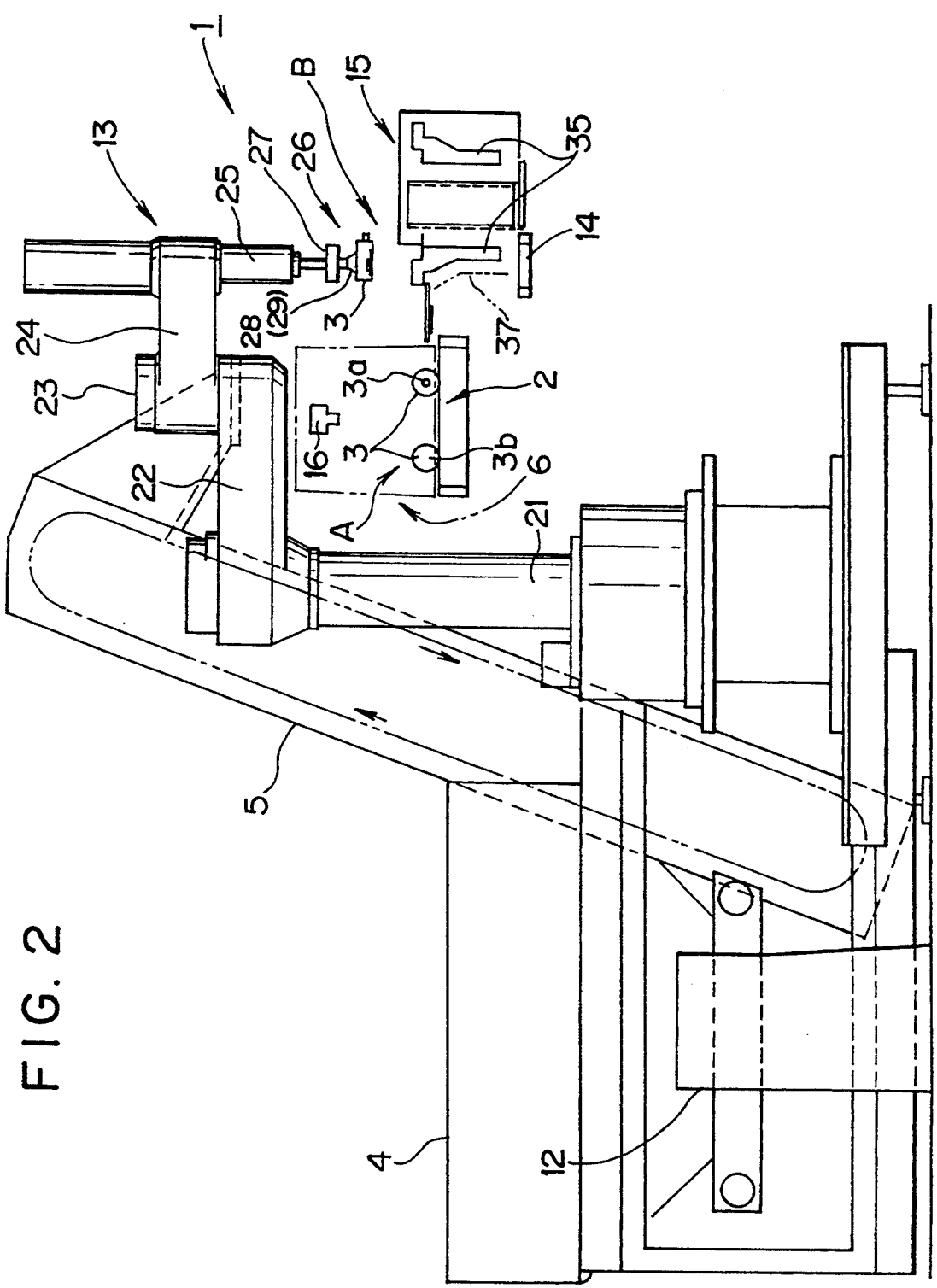
FIG. 2 is a right-hand side elevation of FIG. 1.
Figure 3:
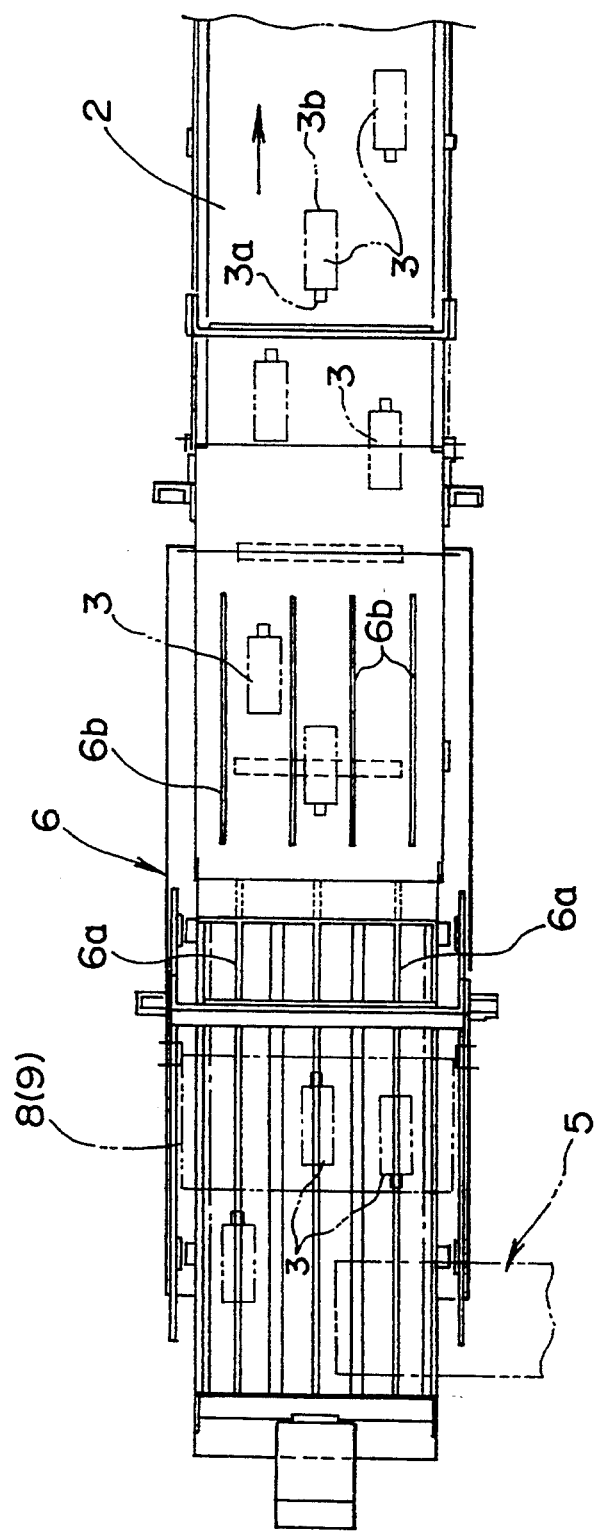
FIG. 3 is an enlarged view of part shown in FIG. 1.
Figure 4:
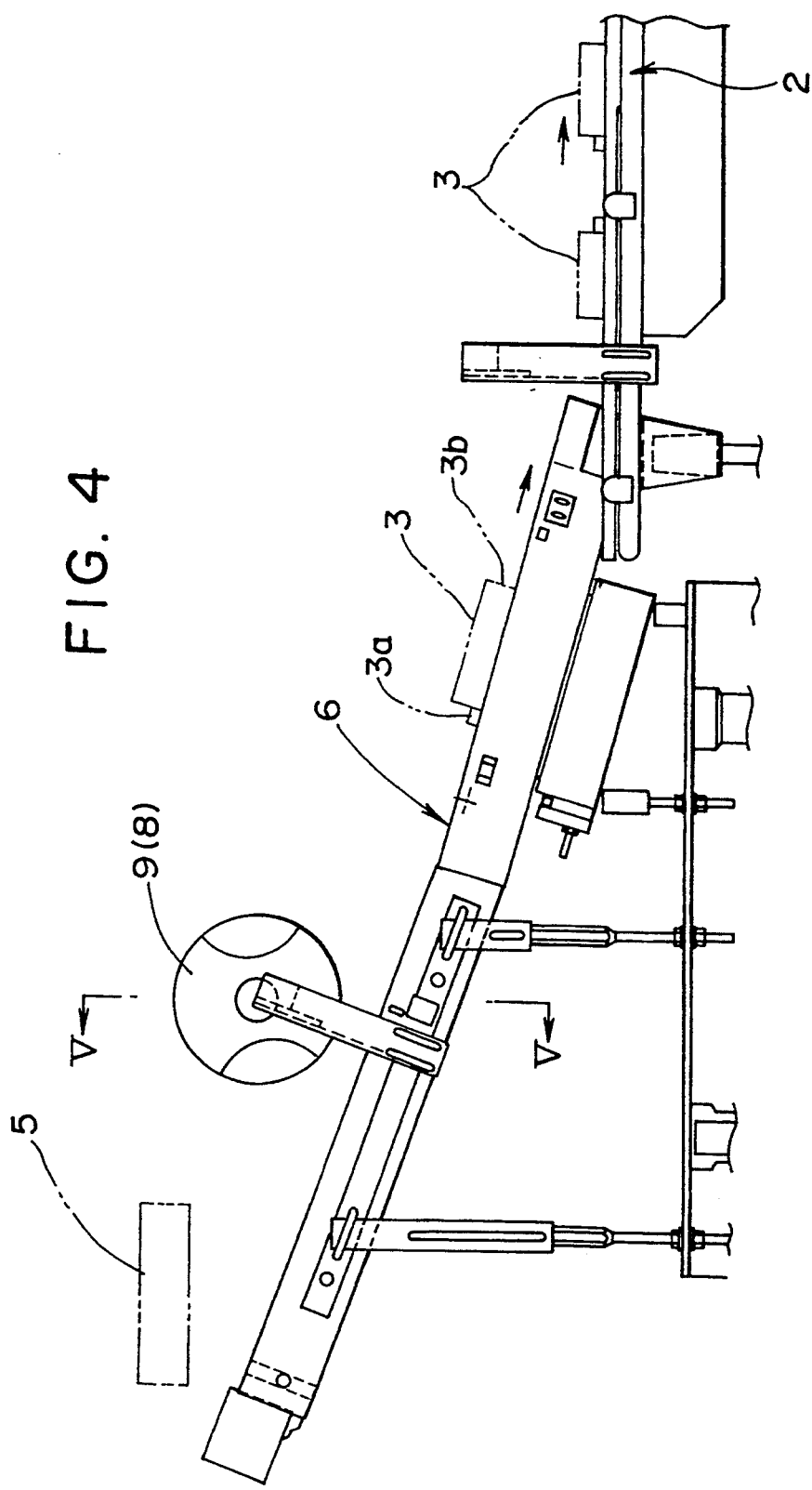
FIG. 4 is a front view of FIG. 3.
Figure 5:
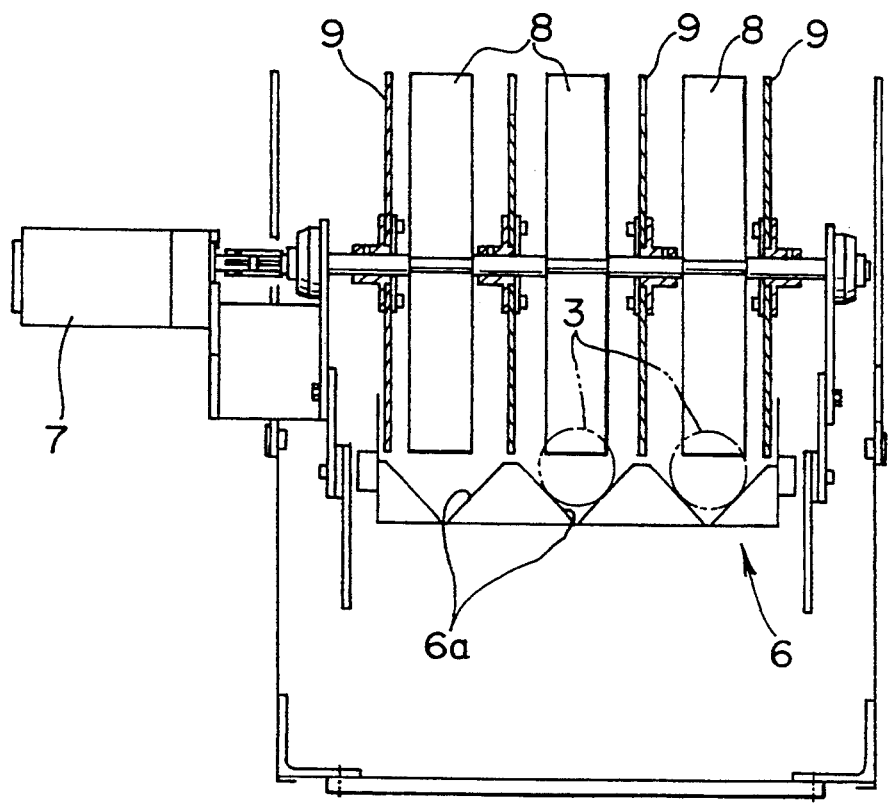
FIG. 5 is a cross section taken along the line V—V shown in FIG. 4.
Figure 6:
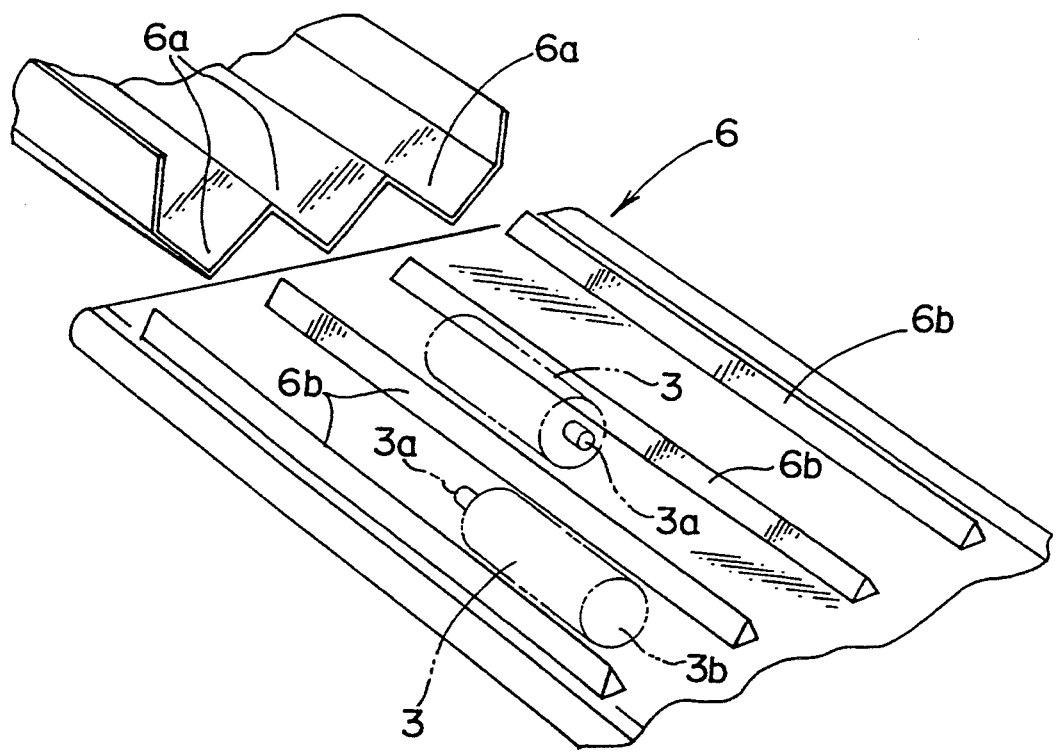
FIG. 6 is a perspective view of part shown in FIG. 3.

Referring to FIG. 2, the robot 13 according to the present embodiment comprises a vertically oriented first drive shaft 21 having an increased diameter, the top end of which is connected with one end of a horizontally disposed first arm 22. The other end of the first arm 22 rotatably carries a vertically oriented second drive shaft 23, which is in turn connected with one end of a horizontally oriented second arm 24. The other end of the second arm 24 rotatably carries a third drive shaft 25 of a reduced diameter, the lower end of which has a processing head 26 mounted thereon.

Figure 7:
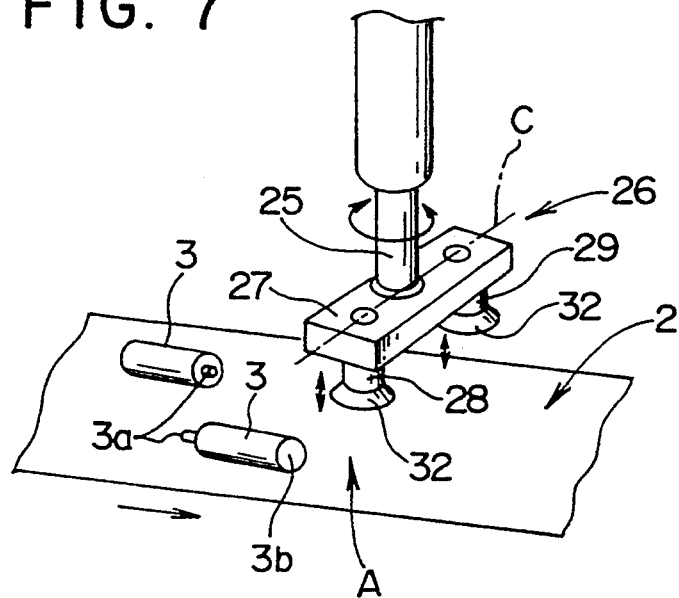
FIG. 7 is a perspective view of part shown in FIG. 1.

As shown in FIG. 7, the processing head 26 includes a support member 27 in the form of a rectangular plate, which is connected to the bottom end of the third drive shaft 25 at its center lengthwise so as to be supported in a horizontal position. Accordingly, as the third drive shaft 25 rotates, the support member 27 can be rotated in either direction in a horizontal plane.

The support member 27 includes a longitudinal centerline C, and a pair of air cylinders 28, 29 are mounted on the bottom surface of the support member 27 at an equal distance from the center or the location where the support member is connected to the third drive shaft 25 along the centerline C. Each air cylinder 28, 29 is directed vertically downward and includes a piston, the lower end of which has a vacuum pad 32 mounted thereon, which serves as a catcher. In the present embodiment, these vacuum pads 32 are effective to hold, by attraction, the outer periphery of the vessel 3, at a location slightly displaced toward the bottom 3b from the center along the length thereof (see FIGS. 8 and 9).

The operation of each air cylinder 28, 29 is controlled by a control unit 12A of the controller 12 so that when each air cylinder 28, 29 is inoperative, the associated vacuum pad 32 is located at its elevated end while when it is operated, each vacuum pad 32 moves down to its lowermost position. The supply and interruption of a negative pressure supplied to the vacuum pad 32 is also controlled by the control unit 12A. The control unit 12A is operative to introduce a negative pressure into the respective vacuum pad 32 during its movement from the catch position A to the release position B where it releases the vessel 3, and ceases to introduce the negative pressure to the vacuum pad 32 from the time when it has released the vessel 3 at the release position B until it returns to the catch position A. Accordingly, the vessel 3 which has been held by the vacuum pad 32 is allowed to drop onto the downwardly located discharge conveyor 14 at the release position B.

In addition to the control unit 12A, the controller 12 also includes a data memory 12B, which has pre-stored data for causing the vacuum pad 32 of the respective air cylinder 28, 29 to hold the vessel 3, by attraction, a the catch position A in a manner such that the lengthwise direction of the vessel 3 in its horizontal position is perpendicular to the lengthwise direction of the support member 27 and such that the vessel 3 is held by attraction by the vacuum pad 32 at a location which is offset from the center of the length thereof toward the bottom 3b as mentioned above.

The control unit 12A of the controller 12 is operative to control the operation of the processing head 26 of the robot 13 in a manner to be described below, while comparing signals fed from the CCD camera 16 and the rotary encoder 17 against the pre-stored data in the data memory 12B.

Figure 8A:
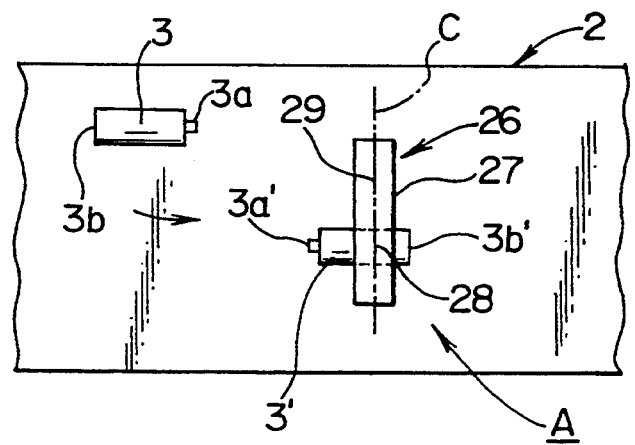
FIG. 8 is a schematic illustration, in plan view, of a processing step where a vessel 3 is caught at catch position A.

Specifically, when the picture of a leading one, 3', of the vessels, the picture of which has been taken by the CCD camera 16, is fed to the controller 12 as illustrated in FIG. 8(a), the control unit 12A compares the picture of the leading vessel 3' against the direction indicated by data stored in the data memory 12B, and moves the processing head 26 to a point where the leading vessel 3' can be held attracted with the perpendicular relationship with respect to the support member 27. As mentioned previously, in the present embodiment, the vessels 3 which are placed on the first conveyor 2 are carried while maintaining its substantially parallel relationship with the direction of conveyance of the first conveyor 2, so that the support member 27 will be supported so as to be perpendicular to the first conveyor 2 at the catch position A. Thereupon, the control unit 12A causes the vacuum pad 32 to move down in order to hold the leading vessel 3' by attraction.

By this time, the picture of a second one of the vessels 3, as taken by the camera 16, will have been fed to the controller 12, and accordingly, the control unit 12A causes the processing head 26 to be slightly displaced in the direction perpendicular to the first conveyor 2 before it causes the other vacuum pad 32 to move down, thus allowing the second vessel 3 to be held by the other vacuum pad 32 by attraction.

Figure 8B:
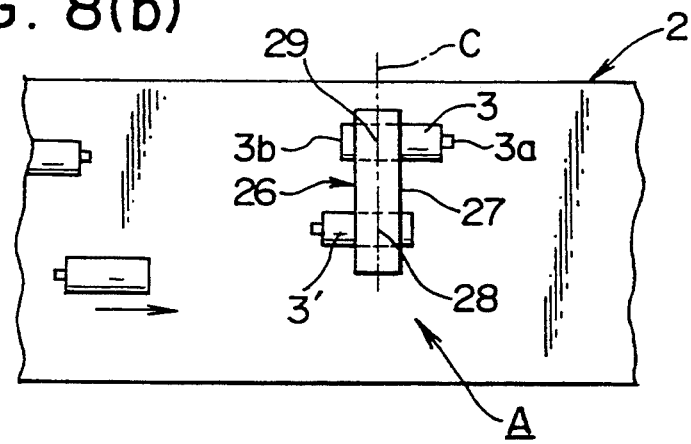

In this manner, when the leading vessel 3' and the second vessel 3 are held attracted by the vacuum pads 32 of the both cylinder units 28, 29, the mouths 3a', 3a of these vessels 3', 3 may be located on the same side, or on the opposite sides as shown in FIG. 8(b), as viewed in the longitudinal direction of the conveyor. This eliminates the need for a substantial rotation of the support member 27 in order to allow it to catch the second vessel 3 after it has held attracted the leading vessel 3', and what is required of the support member 27 is a translational movement through a given stroke. This allows a pair of vessels to be rapidly caught by the vacuum pads 32 of the both cylinder units 28, 29.

On the other hand where it is desired to cause the mouths 3a of the vessels 3 to be always located on one side as viewed longitudinally, it is required that at least the support member 27 be rotated through one-half revolutions, increasing a waiting time until the vessel 3 can be held attracted to thereby retard the processing speed.

Alternatively, an arrangement may be made such that as soon as the vessel 3' is held attracted, the vacuum pad 32 which carries such vessel 3' is raised to its elevated end in order to avoid an interference of the vessel 3' thus carried with another vessel 3 on the first conveyor 4 as the processing head 26 is moved in order to catch a second one 3 of the vessels.

Figure 9:
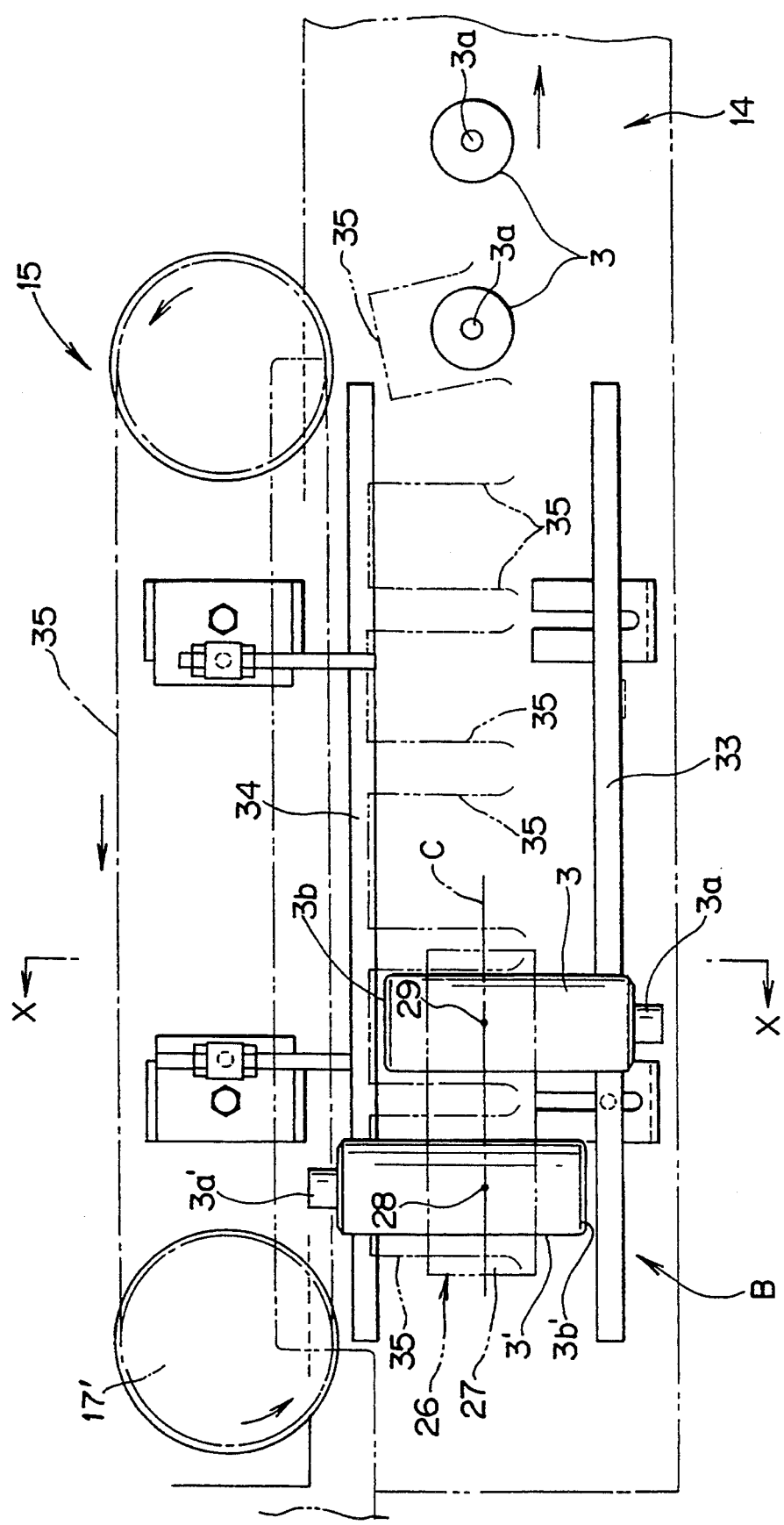
FIG. 9 is an enlarged view of part shown in FIG. 1.

When the pair of vessels 3', 3 are caught at the catch position A by the pair of vacuum pads 32 of the processing head 26, the control unit 12A is operative to cause a movement of the processing head 26 to the release position B shown in FIG. 9. At this time, the support member 27 extends parallel to the direction of the discharge conveyor 14 and is located over the discharge conveyor 14 at a central position crosswise. In this manner, the pair of vessels 3', 3 are located over the discharge conveyor 14, while it is supported horizontally, so as to be perpendicular to the conveyor 14. The control unit 12A then ceases to supply the negative pressure to the vacuum pads 32 at the release position B, whereby these vessels 3', 3 are simultaneously released to drop down, and are then reversed, as required, by the correction means 15.

After releasing the vessels 3', 3 the processing head 26 returns from the release position B to the catch position A, and operates to hold, by attraction, a third and a fourth vessel on the first conveyor 2.

As illustrated in FIGS. 2 and 10, the vessel receiving surface of the discharge conveyor 14 where the release position B is defined is located at a lower elevation than the vessel receiving surface of the first conveyor 2, and the correction means 15 is disposed so as to cover the upstream end of the discharge conveyor 14.

As shown in FIG. 9, the correction means 15 comprises a pair of laterally spaced engaging members 33, 34 which are maintained to be parallel to each other and to be horizontal by means of brackets, and a continuous run of a multiplicity of buckets 35 which are disposed below the engaging members 33, 34 so as to move along a circulating path along the discharge conveyor 14 for preventing the turn-over of the erected vessels 3. The engaging members 33, 34 are in the form of rods, and the spacing therebetween is chosen to be slightly greater than the axial length of the vessel 3 except for its mouth 3a. The buckets 35 are mounted at an equal interval on a pair of upper and lower chains 36, which run in a direction indicated by an arrow along a circulating path. The buckets move along the discharge conveyor 14 in a space between the both engaging members 33, 34 and the vessel receiving surface of the discharge conveyor 14.

Referring to FIG. 9, it will be seen that in the present embodiment, the both vessels 3', 3 which have been carried to the release position B will be located such that the outer periphery thereof which is disposed nearer the associated mouth 3a', 3a is disposed perpendicular to one of the engaging members 33 or 34 while the bottom 3b', 3b does not cross either engaging member 33 or 34. Since the both vessels 3', 3 are simultaneously released under this condition, it will be seen from FIG. 9 or 10 that only the outer periphery which is disposed nearer the mouth 3a' or 3a will bear against one of the engaging members 33 or 34 while the outer periphery located nearer the bottom 3b' or 3b cannot engage the other engaging member 33 or 34, and hence the vessel falls down in the space between the both engaging members 33, 34. In this manner, the vessels 3', 3 which have been in their horizontal position will be rotated so as to bring their mouths 3a', 3a oriented upward, and fall into the adjacent buckets 35 while assuming such position.

In the present embodiment, a drop guide 37 in the form of a plate having its upper portion inclined extends from substantially the lateral center of the discharge conveyor 14 to a point near and below the left-hand engaging member 33 (see FIG. 10) so that the bottom 3b' or 3b of the vessel 3' or 3 which falls down between the both engaging member 33, 34 as it is rotated in the manner mentioned above initially abuts against the upper skewed portion of the drop guide 37 and then falls down in sliding contact with the lower vertical portion of the drop guide. In this manner, it is assured that each vessel 3', 3 is placed on the discharge conveyor 14 in its erected position with its mouth 3a' or 3a oriented vertically upward.

When the vessels 3', 3 are placed on the discharge conveyor 14 in this manner, they will be aligned into a single longitudinal row and in its erect position having their mouths 3a directed upward so as to be delivered into a next processing step.

In the described embodiment, the vessels are maintained in parallel relationship with each other as they are caught by the vacuum pads 32 of the robot 13 at the catch position A, regardless of either mouth 3a or bottom 3b is located on a given longitudinal side. Since the vessels 3 are conveyed by the conveyor 2 while maintaining their parallel relationship with the direction of conveyance of the conveyor 2, there is substantially no need to rotate the support member 27 of the processing head 6 when each vacuum pad 32 operates to catch the vessel 3. In this manner, the vessel 3 can be very rapidly caught at the catch position A. The pair of vessels 3 are simultaneously released at the release position B, and accordingly, the apparatus of the invention obtains a greater throughput.

It will be seen that in the described embodiment, if the size of the vessels 3 to be processed is changed, there is no need for remodelling the components of the apparatus 1, thus providing a very versatile apparatus 1.

While the chute 6 has been used to orient the vessels 3 in the direction of conveyance of the conveyor 2 as they are supplied onto the conveyor 2, the provision of the chute 6 may be eliminated and vessels 3 having random orientations may be placed on the first conveyor 2.

Second Embodiment

Figures 11A, 11B, 11C:
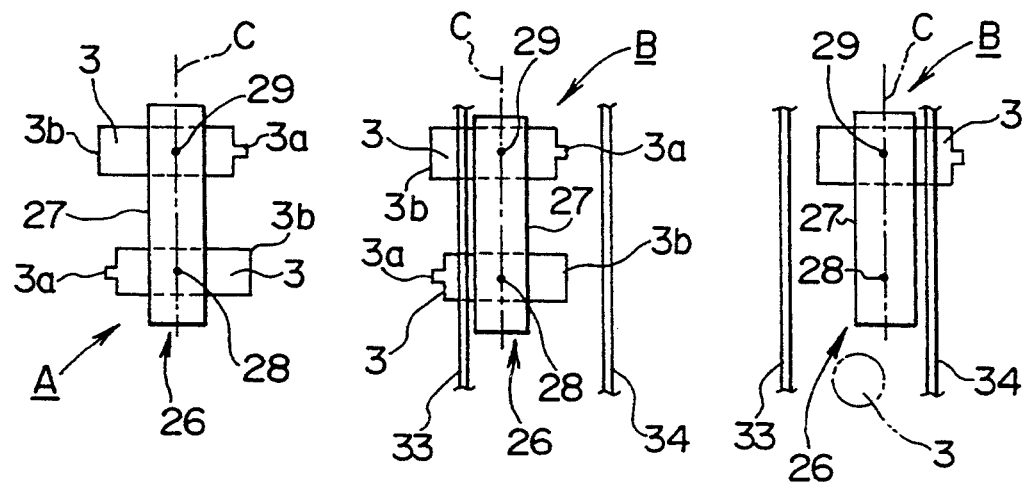
FIGS. 11(a)–11(c) is a schematic illustration of a second embodiment of the invention.

FIGS. 11(a)–11(c) is a schematic illustration of a second embodiment of the invention. In the first embodiment mentioned above, the vessel 3 has been held by the vacuum pad 32 at a location which is offset from the center of the length of the vessel 3 toward the bottom 3b. However, in the second embodiment, the vessel 3 is held by the vacuum pad 32 at its lengthwise center (see FIG. 11(a)). When the pair of vessels 3 thus held are released at the release position B, the support member 27 is initially positioned at a first release position where the outer periphery nearer the mouth 3a of the first vessel 3, which has its mouth 3a disposed on the left-hand side, extends perpendicular to the left-hand engaging member 33, whereupon the first vessel is released (see FIG. 11(b)). Then, the support member 27 is moved to a second release position where the outer periphery nearer the mouth 3a of the second vessel 3, which has its mouth 3a disposed on the right-hand side, extends perpendicular to the right-hand engaging member 34, whereupon the second vessel is released (see FIG. 11(c)).

If the both vessels 3 have their mouths 3a located on the left- or right-hand side, the processing head 26 may be sequentially moved to the first and the second release position. Again a similar effect is achieved as in the first embodiment.

Third Embodiment

Figures 12A, 12B, 12C:
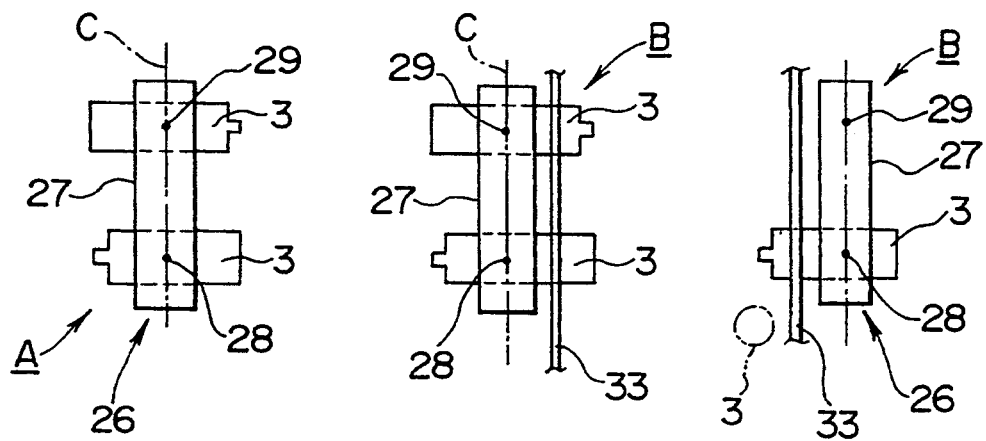
FIGS. 12(a)–12(c) is a schematic illustration of a third embodiment of the invention.
Figure 13:
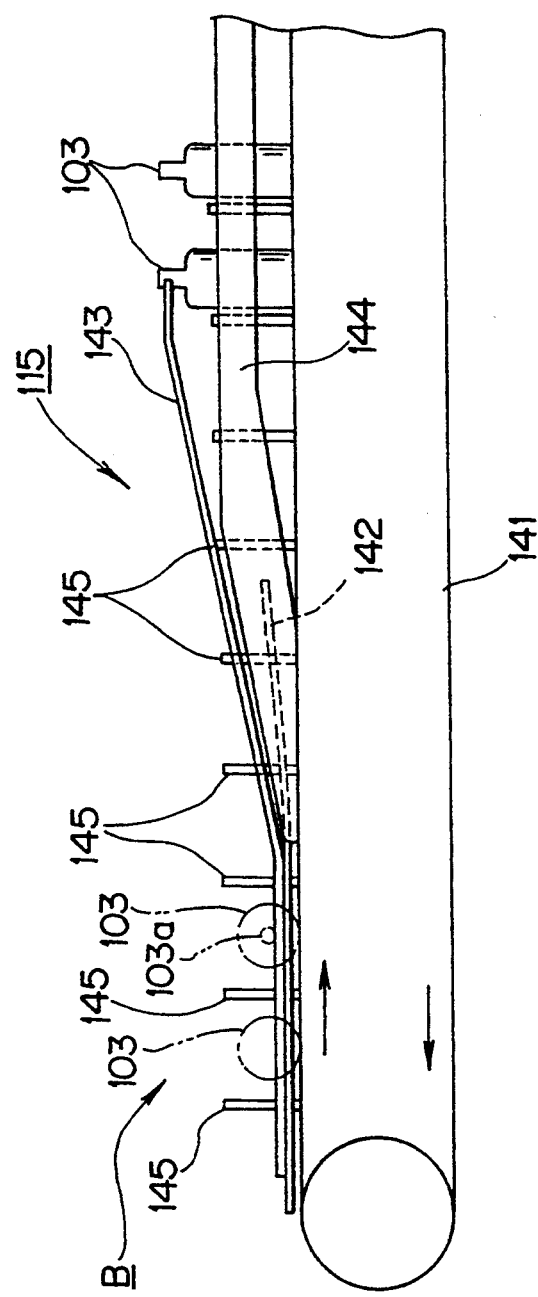
FIG. 13 is a front view of correction means according to a fourth embodiment of the invention.

FIGS. 12(a)–12(c) is a schematic illustration of a third embodiment of the invention where the pair of left and right engaging members 33, 34 used in the previous embodiments are replaced by a single engaging member 33 which is located over the centerline of the discharge conveyor 14. When the vacuum pad 32 is used to hold the vessel 3, the vessel 3 may be held at any location lengthwise thereof. At the release position B, the processing head is initially brought to a first release position where the outer periphery nearer the mouth 3a of the first vessel 3, which has its mouth 3a disposed on the right-hand side, extends perpendicular to the engaging member 33, whereupon the first vessel 3 is released (FIG. 12(b)). Then the processing head is brought to a second release position where the outer periphery nearer the mouth 3a of the second vessel 3, which has its mouth 3a disposed on the left-hand side, to cross perpendicular to the engaging member 33, whereupon the second vessel 3 is released (FIG. 12(c)). As a result of such arrangement, the vessel 3 may be held at any location at the catch position A. The third embodiment achieves the similar functioning and effect as achieved by the previous embodiments.

Fourth Embodiment

FIGS. 13 to 15(a)–15(d) show a fourth embodiment of the invention where correction means 115 comprises a conveyor 141, and pairs of left and right engaging members 142, 143, 144 which are disposed over the conveyor 141.

Vertical plate members 145 are fixedly mounted on the vessel receiving surface of the conveyor 141 at an equal interval as viewed in the direction of conveyance for defining pockets therebetween.

Each pair of engaging members 142, 143, 144 located at the release position B is supported so as to be spaced apart by a distance slightly less than the axial length of a vessel 103 and so as to be located at an elevation below the external diameter of the vessel which assumes its horizontal position in the most upstream region of the conveyor 141, but the more they are located downstream, the spacing between the members of each pair is gradually reduced while their elevation is increased.

Figure 15A:
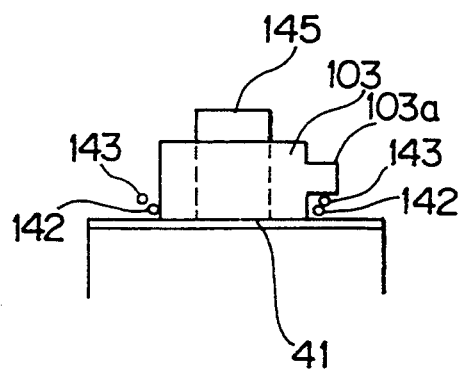
FIGS. 15(a)–15(d) illustrates a process of erecting a vessel by the correction means shown in FIG. 13.
Figure 15B:
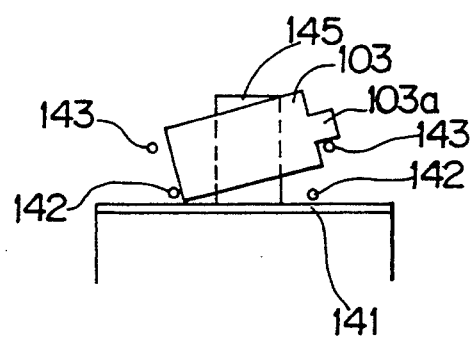
Figure 15C:
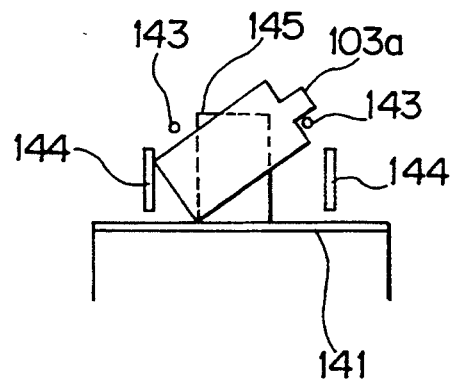
Figure 15D:
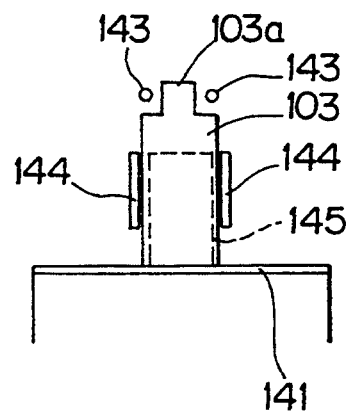

Therefore, it will be seen from FIG. 14 where a pair of vessels 103 having their mouths 103a disposed on the opposite sides from each other are released at the release position B and placed into pockets 141A formed on the conveyor 141, the vessel 103 disposed in such pocket 141A will have its mouth 103a placed on the engaging member 142 (see FIG. 15(a)). Subsequently, as the vessel 103 is conveyed downstream while it is held in the pocket 141A, the mouth 103a will engage the engaging member 142 while the outer periphery in the rear region, as viewed in the direction of travel, is supported by the plate member 145, and since the outer periphery of the vessel 103 becomes engaged with the engaging member 144, the vessel will be gradually rotated to be erected (FIG. 15(b) to FIG. 15(d)).

It is to be noted that in the above description of the fourth embodiment, parts corresponding to those shown in the first embodiment are designated by like numerals as used before, to which 100 is added. Again, a similar functioning and effect are achieved as mentioned previously.

Fifth Embodiment

Figure 16:
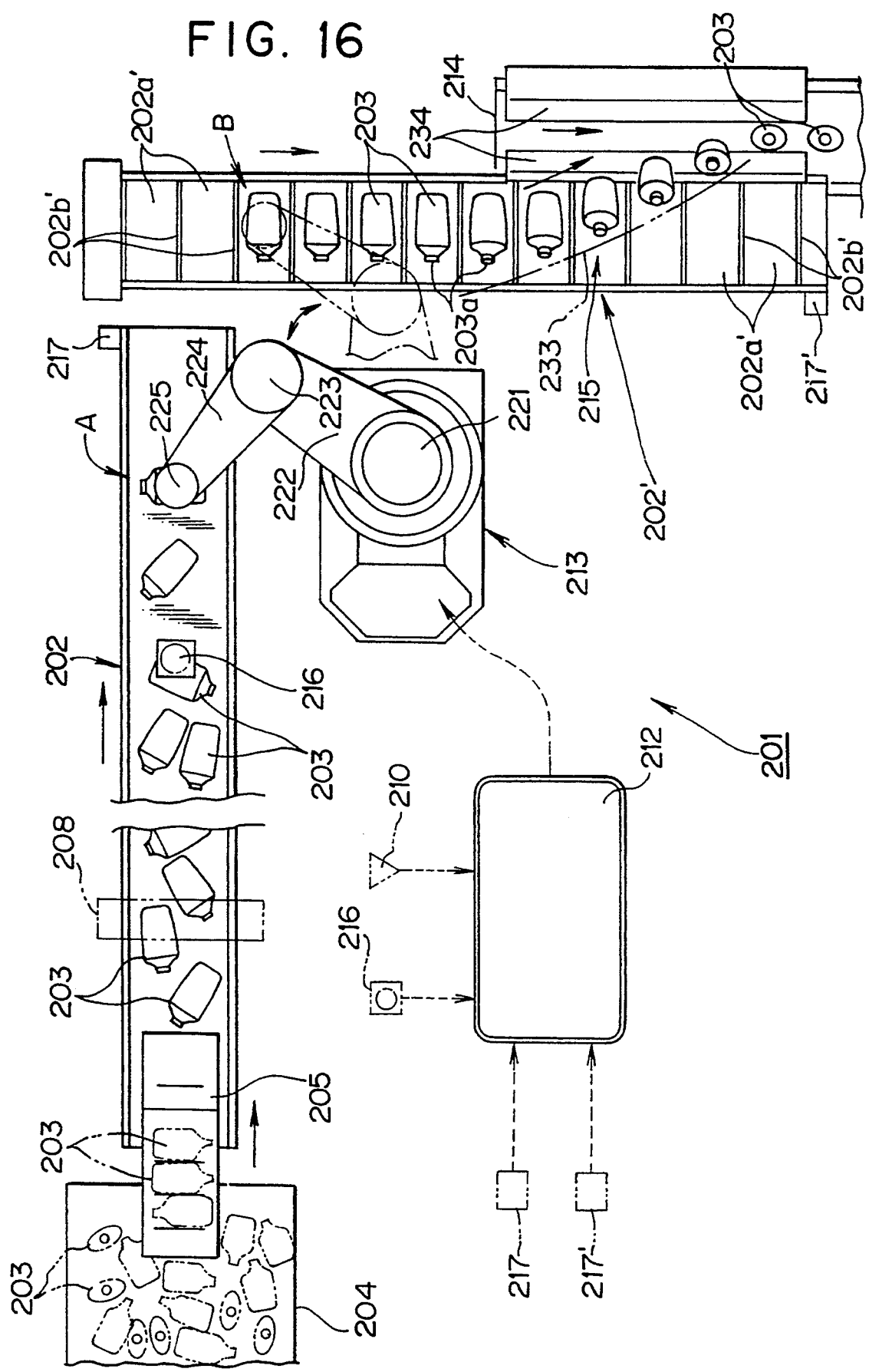
FIG. 16 is a plan view of a fifth embodiment of the invention.
Figure 17:
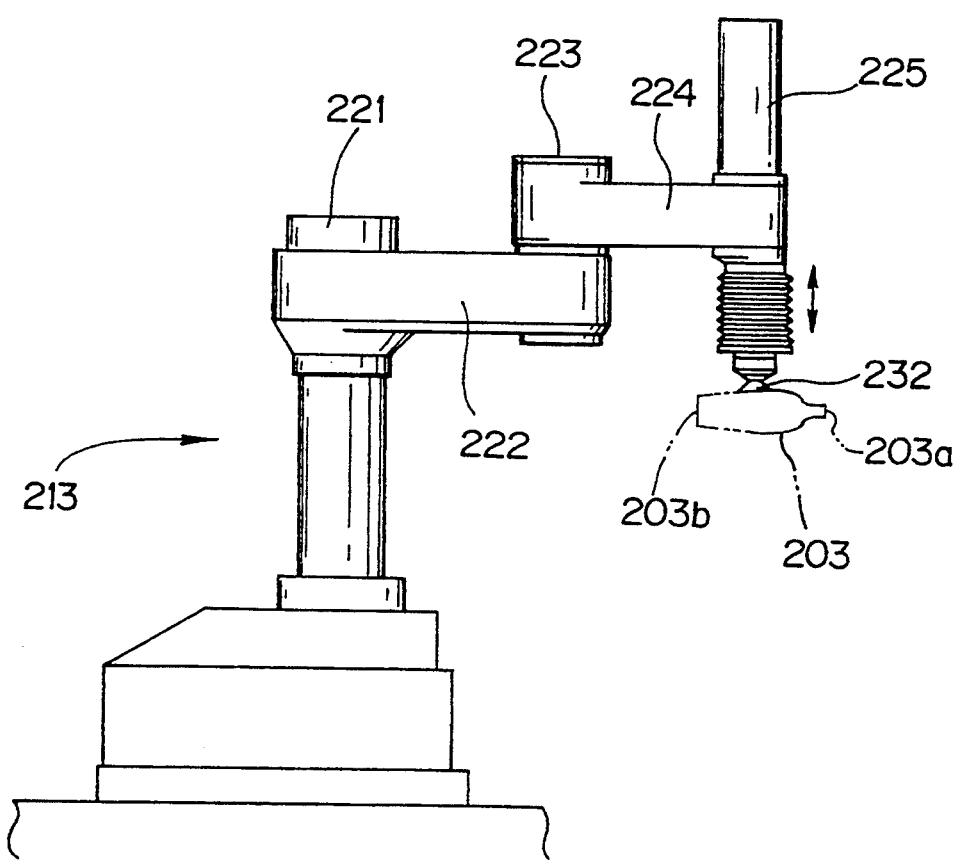
FIG. 17 is a front view of part shown in FIG. 16.

FIGS. 16 and 17 illustrate a fifth embodiment of the invention. In the fifth embodiment, located adjacent to one end of a first conveyor 202 is a second conveyor 202' which is disposed to extend in a direction perpendicular to the first conveyor, and a discharge conveyor 214 is disposed to be parallel with and alongside the second conveyor 202'. In the fifth embodiment, a vessel 203 is a flat vessel such as having an elliptical cross section, and such vessels 203 are supplied in random orientations onto the first conveyor 202 to be conveyed to the catch position A.

In the fifth embodiment, a robot 213 is provided with a single vacuum pad 232, and is constructed such that after it has caught a vessel 203 at the catch position A, when it releases the vessel 203 at a release position B, it delivers the vessel into each pocket 202a' formed on the second conveyor 202 with its mouth 203a oriented to the left, as viewed in FIG. 16.

A plurality of plate members 202b' are mounted on the vessel receiving surface of the second conveyor 202' at an equal pitch to define the individual pockets 202a', and a guide member 233 in the form of a rod is disposed over the second conveyor 202' so as to cross the path of conveyance of this conveyor. The discharge conveyor 214 is disposed adjacent to the guide member 233, and includes a pair of drop guides 234 which are maintained at a given spacing from each other and which are chevron-shaped in section, formed by plate members, so that their insides opposing each other decline downwardly to define a valley therebetween.

A vessel 203 which is delivered to the pocket 202a' on the second conveyor 202 will be urged toward the pair of drop guides 234 as a result of the engagement of its mouth 203a with the guide member 233 as it is conveyed downstream on the conveyor, and is then guided by the pair of drop guides 234 as it falls to pass therebetween to be placed on the discharge conveyor 214. As a result of the guiding action of the drop guides 234, the vessel 203 will be erected to its upright position on the discharge conveyor 214. Thus, in the fifth embodiment, the combination of the pocket 202a' of the second conveyor 202', the guide member 233 and the drop guides 234 constitute together correction means 215 which erects the vessel 203.

In the fifth embodiment, rotary encoders 217, 217' are mounted on the first and the second conveyors 202, 202', respectively, for detecting the speed of conveyance, which is input to a controller 212. In response to the speed of conveyance of each conveyor 202, 202' detected by the both rotary encoders 217, 217', the controller 212 causes the vacuum pad 232 of the robot 213 to follow the conveying operation of the both conveyors 202, 202' when the pad 232 receives and delivers the vessel 203 at the positions A and B.

In other respects, the arrangement is similar to that of the first embodiment. It is to be noted that the components appearing in the fifth embodiment and corresponding to those shown in the first embodiment are designated by like reference numerals as before, to which 200 is added.

Again, if the size of the vessel 203 is changed, there is no need of remodelling components which constitute together the vessel aligning apparatus 201 according to the fifth embodiment, thus providing a high versatility as in the first embodiment.

While the invention has been described above in connection with several embodiments thereof, it should be understood that a number of changes, modifications and substitutions therein will readily occur to one skilled in the art from the above disclosure without departing from the spirit and scope of the invention defined by the appended claims.

What is claimed is:

1. An apparatus for aligning vessels comprising a first conveyor for conveying vessels which are supplied at random, a second conveyor disposed adjacent to the first conveyor for conveying the vessels, a camera disposed on a path of conveyance of the vessels by the first conveyor for photographing a manner of placement of vessels thereon, a robot responsive to the camera for catching vessels on the first conveyor, then delivering the vessels from the first conveyor to the second conveyor and aligning the vessels on the second conveyor, and correction means disposed on a path of conveyance of the second conveyor for erecting a vessel from a horizontal position to an upright position as it is conveyed by the second conveyor.

2. An apparatus according to claim 1 in which the operation of the robot is controlled by a controller to which a picture of a vessel or vessels on the first conveyor as taken by the camera is input, the controller being operative to compare a direction of a vessel, the picture of which is input from the camera, against a pre-stored direction in which the vessel is to be oriented and to calculate an angle of rotation by which the robot must be rotated in order to catch a vessel on the first conveyor.

3. An apparatus according to claim 2, further including a rotary encoder mounted on the first conveyor and a rotary encoder mounted on the second conveyor, each rotary encoder for detecting a respective speed of conveyance, which is input to the controller, the controller being operative to cause the robot to follow the conveying operation of both the conveyors when the robot receives and delivers a vessel at given positions on the respective conveyors.

4. An apparatus according to claim 2 in which speeds at which the first conveyor and the correction means are operated are input to the controller through respective rotary encoders mounted thereon, the controller being operative to cause the robot to follow the movement of the first conveyor and the correction means at positions where it receives or delivers a vessel from the first conveyor and to the correction means.

5. An apparatus according to claim 1 in which the robot includes a catcher for catching a vessel having a mouth at its one lengthwise end and a bottom at its other end, the robot operating such that the catcher catches a vessel placed in horizontal position on the first conveyor at a catch position defined on the first conveyor when the vessel assumes a predetermined orientation or an opposite orientation with respect to the catcher, and the catcher carries the vessel caught thereby to a release position defined on the second conveyor where it releases the vessel, the correction means being disposed at the release position and being operative to engage a portion of the vessel released from the catcher which is located adjacent to the mouth while it assumes a horizontal position and erect the vessel by rotating the vessel so that the mouth thereof is oriented upwardly.

6. An apparatus according to claim 5 in which the robot includes a plurality of catchers, which are disposed on a line extending perpendicular to the lengthwise direction of the vessel when the respective catchers hold the associated vessels in parallel relationship with each other.

7. An apparatus according to claim 5 in which the correction means comprises a pair of engaging members which are supported in a horizontal plane and spaced apart by a given distance such that upon release from the catcher, the mouth of the vessel engages either one of the engaging members when it assumes a horizontal position while the bottom of the vessel does not engage either engaging member, thus allowing the vessel to fall between the both engaging members to be erected to its upright position.

8. An apparatus according to claim 7 in which the release position includes a first release position where the mouth of the vessel held by the catcher crosses the left engaging member while the bottom of that vessel does not cross the right engaging member, and a second release position displaced from the first release position and where the mouth of a vessel which is held by the catcher in the opposite orientation from the first mentioned vessel crosses the right engaging member while the bottom of that vessel does not cross the left engaging member.

9. An apparatus according to claim 7 in which the vessel is held by the catcher at a location thereon which is by a given distance offset from the lengthwise center thereof toward the bottom thereof, the catcher moving to a release position intermediate the pair of engaging members at said release position where the mouth of the vessel caught by the catcher crosses one of the engaging members while the bottom of the vessel does not cross the other engaging member.

10. An apparatus according to claim 5 in which the correction means comprises a single engaging member which is supported in a horizontal plane, the catcher being movable to a first release position where the mouth of the vessel held by the catcher crosses the engaging member from the right-hand side thereof, and a second release position where the mouth of the vessel held by the catcher crosses the engaging member from the left-hand side thereof.

11. An apparatus according to claim 5 in which the second conveyor is disposed adjacent to an end of the first conveyor, extends in a direction perpendicular to the first conveyor, and includes a vessel receiving surface on which a plurality of pockets are formed at an equal interval, the correction means comprising the pockets defined on the Vessel receiving surface of the second conveyor as well as a pair of engaging members disposed over the second conveyor along the both lateral sides thereof, the pair of engaging members being supported in a manner such that the elevation increases and the both engaging members moving toward each other as they proceed downstream as viewed in the direction of conveyance, the pair of engaging members engaging the vessel as it is received in the pocket and conveyed by the second conveyor to rotate it gradually from its horizontal position to its upright position.

* * * * *